O. N. SKAARAAS.
Seed-Drill.

No. 200,943.   Patented March 5, 1878.

WITNESSES:
Henry N. Miller
J H Scarborough

INVENTOR:
O. N. Skaaraas
BY Munn &Co
ATTORNEYS.

UNITED STATES PATENT OFFICE.

OLE N. SKAARAAS, OF HALE, WISCONSIN.

IMPROVEMENT IN SEED-DRILLS.

Specification forming part of Letters Patent No. 200,943, dated March 5, 1878; application filed November 17, 1877.

*To all whom it may concern:*

Figure 1:
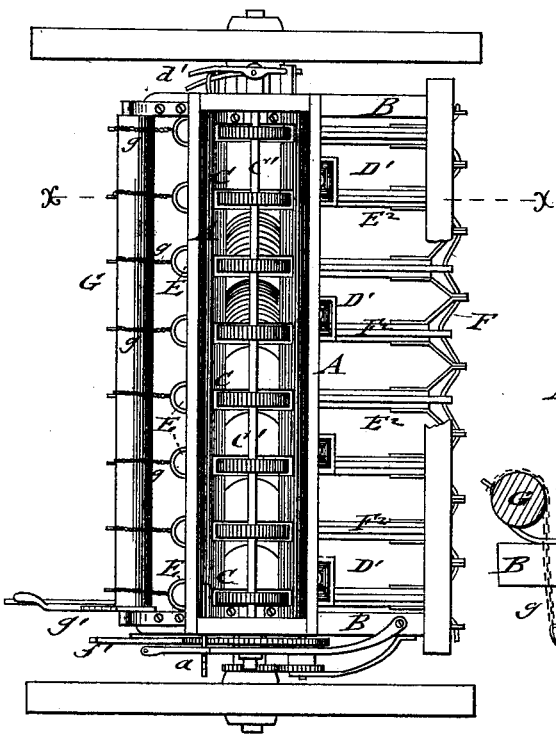
Figure 3:
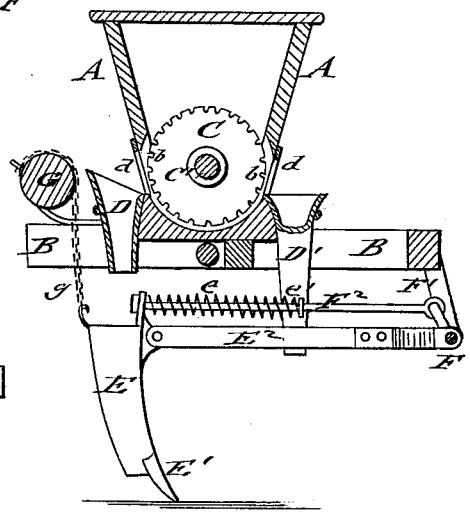
Figure 2:
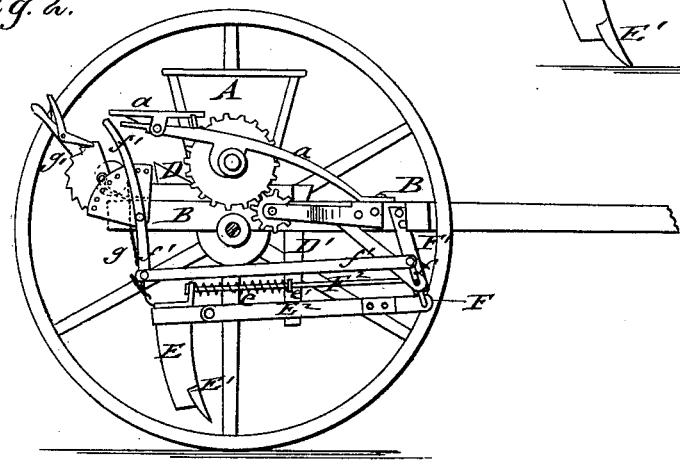

Be it known that I, OLE N. SKAARAAS, of Hale, in the county of Trempealeau and State of Wisconsin, have invented a new and Improved Seed-Drill, of which the following is a specification:

In the accompanying drawing, Figure 1 represents a plan view, Fig. 2 a side view, and Fig. 3 a vertical transverse section on line $x\,x$, Fig. 1, of my improved seed-drill.

Similar letters of reference indicate corresponding parts.

The invention will first be described in connection with the drawing, and then pointed out in the claims.

Referring to the drawings, A represents the seed-box, that is supported on a frame, B, that rests on the axle of the wheels, and has the usual tongue to attach the horses. The seed-box A extends across the full width between the wheels, and has at the inside a number of feed-wheels, C, that are keyed to a lateral shaft, C', which is revolved in bearings of the seed-box by means of suitable gearing meshing with a cog-wheel of the hub of one of the drill-supporting wheels.

The cog-wheel of the feed-wheel shaft C' is made movable on the shaft by a suitable hand-lever arrangement, $a$, for the purpose of being thrown in or out of gear with the intermeshing gearing of the driving-wheel, and establish or interrupt the motion of the feed-wheels.

The sides and bottom of the seed-box are recessed for the feed-wheels, and the bottom made at one side of the wheels dishing or semi-funnel shaped, for conducting the seed under the feed-wheels, and having it taken up by the notched or milled circumferences of the same. The seed is thereby fed to the exit-openings $b$ of the seed-box A, the size of which is regulated by means of a lateral slide, $d$, adjusted by a hand-lever, $d'$, at the end. The seed thus fed to the outside is taken up by a series of fixed funnel-shaped conductors, D, which are attached to the outer rear part of the seed-box in close connection with the exit-holes, as shown clearly in Fig. 3, as many conductors being provided as there are feed-wheels.

At the front part of the seed-box are also arranged seed-conductors D', but only about half the number, which take up in similar manner as the rear conductors, by means of front exit-holes and a regulating-slide, the seed, but drop the same, not in line with the rear conductors, but intermediately between the same, by having the tubular portion of the front conductor bent sidewise and made slightly larger at the lower end, so as to spread the seed and throw it broadcast over the land.

The rear conductors drop the seed into tapering tubes E with cultivator-teeth $E^1$, at the lower ends of which as many are arranged as there are seed-conductors. The tubes E are pivoted to the ends of horizontal arms $E^2$, which are hung by their forked front ends to a compound crank-shaft, F, that is supported in fixed brackets $F^1$ of frame B. The crank-shaft F is formed with as many bends or cranks as there are teeth, and is connected with the upper ends of all the tubes E by rods $F^2$, which are hung to the crank ends and attached in suitable manner to the tubes E.

Spiral cushioning-springs $e$ are placed on the connecting-rods $F^1$ between the tubes E and fixed screw-nuts $e'$, and serve to give some elasticity to the teeth, so that they are not injured by stones or other obstructions.

The crank-shaft F is connected at one end to a crank-rod, $f$, and operated by a hand-lever and rack device, $f'$, so as to swing the crank-shaft forward and back, and produce thereby the oscillation of the tubes and cultivator-teeth on the pivots of the arms $E^2$, for the purpose of adjusting the tubes below the mouths of the fixed conductor-tubes, and take up the seed dropped by the same in reliable manner.

The tubes E are also hung by chains or ropes $g$ to a roller or drum, G, that turns in bracket-supports of frame B, and is adjusted by a hand-lever, pawl, and rack, $g'$, so as to wind or unwind the chains and raise or lower the teeth. By turning the drum to its extreme limit of the rack, the teeth are raised sufficiently above the ground to clear the same for carrying the drill from place to place, the shaft of the feed-wheels being thrown out of gear at the same time, and the exit-holes of the seed-box closed by the slides, so as to interrupt the work of the drill.

The drill sows the seed in reliable and rapid manner, distributing it evenly over the lands, admits the perfect regulating of the quantity to be dropped, and secures the safe conducting of the same to the ground.

Having thus described my invention, I claim as new and desire to secure by Letters Patent—

1. The combination, with forked arms $E^2$, having the drill-tubes pivoted thereto, of the compound crank-shaft F and rods $F^2$, carrying springs $e$, substantially as and for the purpose specified.

2. The combination, with arms $E^2$, of the drill-tubes, the crank-shaft F, and the rods and springs $F^2$ $e$, the connecting-rod, rack, and operating-lever, substantially as shown and described.

OLE NIELSEN SKAARAAS.

Witnesses:
 A. H. LEWIS,
 S. H. FOLKEDAHL.